United States Patent
Cho et al.

(10) Patent No.: US 9,876,651 B2
(45) Date of Patent: Jan. 23, 2018

(54) HOME APPLIANCE AND HOME NETWORK SYSTEM USING THE SAME

(71) Applicant: SAMSUNG ELECTRONICS CO., LTD., Suwon-si (KR)

(72) Inventors: Dong Seok Cho, Seoul (KR); Hoon Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/288,608

(22) Filed: May 28, 2014

(65) Prior Publication Data

US 2014/0355588 A1 Dec. 4, 2014

(30) Foreign Application Priority Data

May 30, 2013 (KR) .................. 10-2013-0061522

(51) Int. Cl.
| | |
|---|---|
| *H04W 4/02* | (2009.01) |
| *G08C 17/02* | (2006.01) |
| *H04L 12/28* | (2006.01) |
| *H04W 88/08* | (2009.01) |
| *H04L 12/64* | (2006.01) |

(52) U.S. Cl.
CPC .......... *H04L 12/2816* (2013.01); *G08C 17/02* (2013.01); *H04L 12/6418* (2013.01); *H04W 88/08* (2013.01); *G08C 2201/40* (2013.01)

(58) Field of Classification Search
CPC ....... H04W 88/08; H04W 4/02; H04W 8/005; H04L 12/28; H04L 12/6418; H04L 12/2816; G08C 17/02; G08C 2201/40
USPC .......................................................... 370/338
See application file for complete search history.

(56) References Cited

U.S. PATENT DOCUMENTS

| | | | | |
|---|---|---|---|---|
| 2008/0064395 | A1* | 3/2008 | Sibileau ................. | G08C 17/02 455/433 |
| 2009/0262665 | A1* | 10/2009 | Kim et al. .................... | 370/254 |
| 2010/0321201 | A1* | 12/2010 | Huang et al. ............ | 340/825.22 |
| 2011/0046751 | A1* | 2/2011 | Lee et al. ........................ | 700/19 |
| 2011/0106279 | A1* | 5/2011 | Cho ....................... | G08C 17/02 700/90 |

(Continued)

FOREIGN PATENT DOCUMENTS

| | | |
|---|---|---|
| JP | 2001-189976 | 7/2001 |
| KR | 10-2007-0080727 | 8/2007 |
| KR | 10-2011-0139030 | 12/2011 |

OTHER PUBLICATIONS

European Search Report dated Feb. 18, 2015 issued in corresponding European Patent Application 14170175.5.

*Primary Examiner* — Edan Orgad
*Assistant Examiner* — Vanneilian Lalchinthang
(74) *Attorney, Agent, or Firm* — Staas & Halsey LLP

(57) ABSTRACT

A home network system has a home appliance, a portable terminal to receive a control command associated with the home appliance, and an access point to allow the home appliance or the portable terminal to be connected to a wide area network (WAN), wherein the access point notifies the home appliance of the connection of the portable terminal if the portable terminal connects to the access point, so that the home application detects that a user returns home and performs a certain operation as a user connects to the access point when returning home.

22 Claims, 15 Drawing Sheets

(56) References Cited

U.S. PATENT DOCUMENTS

| | | | |
|---|---|---|---|
| 2012/0038481 A1* | 2/2012 | Fujimoto | G06Q 10/06 340/573.1 |
| 2012/0127980 A1* | 5/2012 | Quinn | H04W 8/005 370/338 |
| 2012/0280801 A1* | 11/2012 | Muratsu | G08C 17/00 340/12.5 |
| 2013/0089027 A1* | 4/2013 | Son et al. | 370/328 |
| 2013/0275957 A1* | 10/2013 | Villar | G06F 9/4445 717/173 |
| 2014/0156082 A1* | 6/2014 | Ha | D06F 33/02 700/275 |

* cited by examiner

HOME APPLIANCE AND HOME NETWORK SYSTEM USING THE SAME

CROSS-REFERENCE TO RELATED APPLICATIONS

This application claims the priority benefit of Korean Patent Application No. 10-2013-0061522, filed on May 30, 2013, in the Korean Intellectual Property Office, the disclosure of which is incorporated herein by reference.

BACKGROUND

1. Field

The following description relates to a home appliance and a home network system using the same, and more particularly, to a home appliance to detect the entrance and exit of a user (U) by use of a portable terminal carried by the user (U), and allowing the control thereof according to the entrance and exit of the user (U), and a home network system using the same.

2. Description of the Related Art

Home appliances refer to devices which are mainly provided at user's home to help a user perform housework. In general, such a home appliance is located at the user's home, and operates according to a command of a user. In addition, the home appliance connects to Internet through a Wi-Fi communication, collects information related to an operation of the home appliance through Internet or receives a control command of a user through Internet.

In recent years, there is a demand for a home appliance to detect an entrance and exit of a user and perform an operation in response to the entrance and exit, for example, an automatic operation of an air conditioner and an automatic cooking upon user's return home from the work.

Meanwhile, a conventional home appliance determines whether or not a user exists around a home appliance using a temperature sensor, but has difficulty in determining whether or not a user moves to another room or goes out.

SUMMARY

Therefore, it is an aspect of the present disclosure to provide a home appliance capable of performing a certain operation or displaying a certain message by recognizing the entrance and exit of a user, and a home network system having the same.

Additional aspects of the disclosure will be set forth in part in the description which follows and, in part, will be obvious from the description, or may be learned by practice of the disclosure.

In accordance with one aspect of the present disclosure, a method of controlling a home network system which has a home appliance, a portable terminal to receive a control command associated with the home appliance, and an access point to allow the home appliance or the portable terminal to be connected to a wide area network (WAN) includes connecting, by the portable terminal, to the access point, notifying, by the access point, the home appliance that the portable terminal connects to the access point if the portable terminal connects to the access point, and performing, by the home appliance, a predetermined operation if the home appliance is notified that the portable terminal connects to the access point.

The connecting of the portable terminal to the access point may include transmitting, by the portable terminal, a request to the access point for connection to the access point, and transmitting, by the portable terminal, identification information of the portable terminal to the access point.

The identification information of the portable terminal may include one of a media access control address (MAC address), a service set identifier (SSID), and a predetermined identifier (ID).

The notifying by the access point that the portable terminal connects to the access point may include identifying, by the access point, the portable terminal based on identification information of the portable terminal, and notifying, by the access point, the home appliance that the identified portable terminal connects to the access point.

The performing of the predetermined operation by the home appliance may include identifying, by the home appliance, a user of the connected portable terminal based on the connected portable terminal, and performing, by the home appliance, the predetermined operation according to the identified user.

The performing of the predetermined operation according to the identified user may include displaying a previously stored message.

The performing of the predetermined operation according to the identified user may further include transmitting the previously stored message to the portable terminal.

In accordance with another aspect of the present disclosure, a home network system includes a home appliance, a portable terminal, and an access point. The portable terminal may be configured to receive a control command associated with the home appliance. The access point may be configured to allow the home appliance or the portable terminal to be connected to a wide area network (WAN). If the portable terminal connects to the access point, the access point may notify the home appliance that the portable terminal connects to the access point.

Upon notified that the portable terminal connects to the access point, the home appliance may perform a predetermined operation.

The portable terminal may transmit a request to the access point for connection to the access point, and transmit identification of the portable terminal to the access point.

The identification information of the portable terminal may include one of a media access control address (MAC address), a service set identifier (SSID), and a predetermined identifier (ID).

The home appliance may identify a user of the connected portable terminal based on the connected portable terminal, and perform the predetermined operation according to the identified user.

The home appliance may display a previously stored message.

The home appliance may transmit the previously stored message to the portable terminal.

In accordance with another aspect of the present disclosure, a home appliance that is connectable to a wide area network (WAN) includes a manipulator, a display, a communicator and a controller. The manipulator may be configured to receive a command associated with an operation of the home appliance. The display may be configured to display operation information of the home appliance. The communicator may be configured to communicate with an access point so as to connect to the WAN. The controller may be configured to control the display or the communicator to perform a predetermined operation if a portable terminal of a user connects to the access point.

If the portable terminal connects to the access point, a predetermined message may be displayed through the display.

If the portable terminal connects to the access point, a predetermined message may be transmitted to the portable terminal through the communicator.

The home appliance may further include a heater to heat a substance that is accommodated in a cooking space to be cooked. The controller may control the heater to heat the substance if the portable terminal connects to the access point.

The home appliance may further include a heat exchanger to adjust temperature of an air-conditioning space. The controller may control the heat exchanger to adjust the temperature of the air-conditioning space if the portable terminal connects to the access point.

The home appliance may further include a driving motor to rotate a drum such that a substance that is accommodated in the drum is washed. The controller may control the display to indicate that the substance to be washed is completed with washing if the portable terminal connects to the access point.

The home appliance may further include a sound output configured to output sound corresponding to operation information of the home appliance.

A predetermined sound may be output through the sound output if the portable terminal connects to the access point.

As is apparent from the above description, when a user returns home, the home appliance performs a certain operation or displays a certain message by recognizing the entrance and exit of the user based on connection of the portable terminal possessed by the user to an access point, and a home network system having the same.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
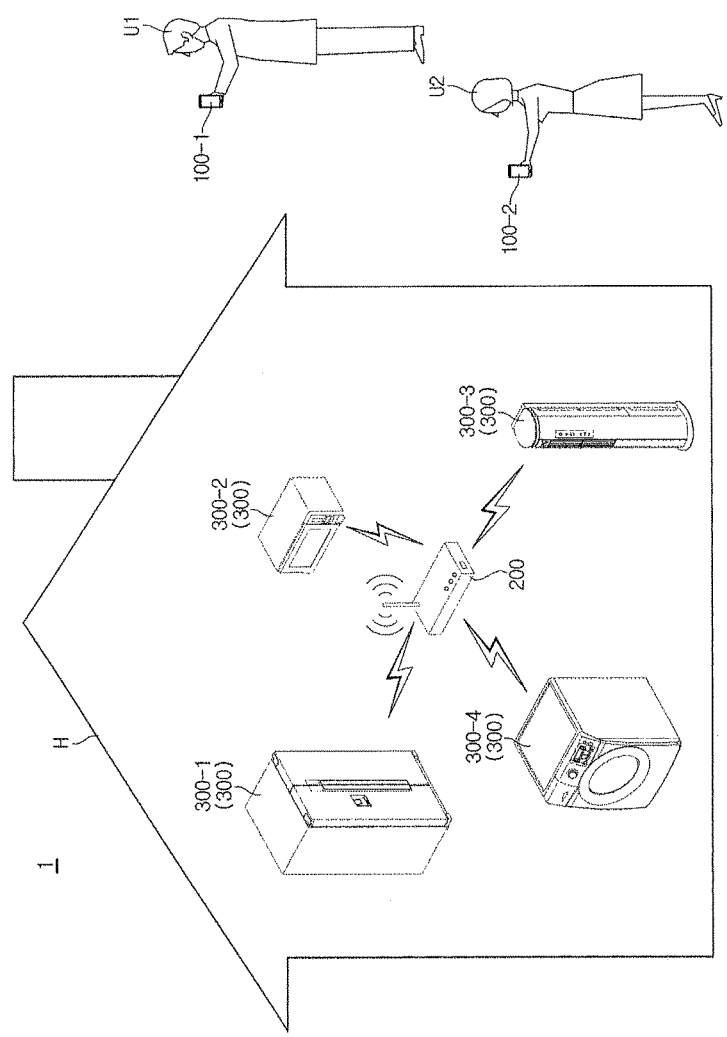
FIG. 1 is a drawing illustrating a home network system in accordance with an embodiment of the present disclosure.

Reference will now be made in detail to embodiments of the present disclosure, examples of which are illustrated in the accompanying drawings, wherein like reference numerals refer to like components throughout.

Figure 2A:
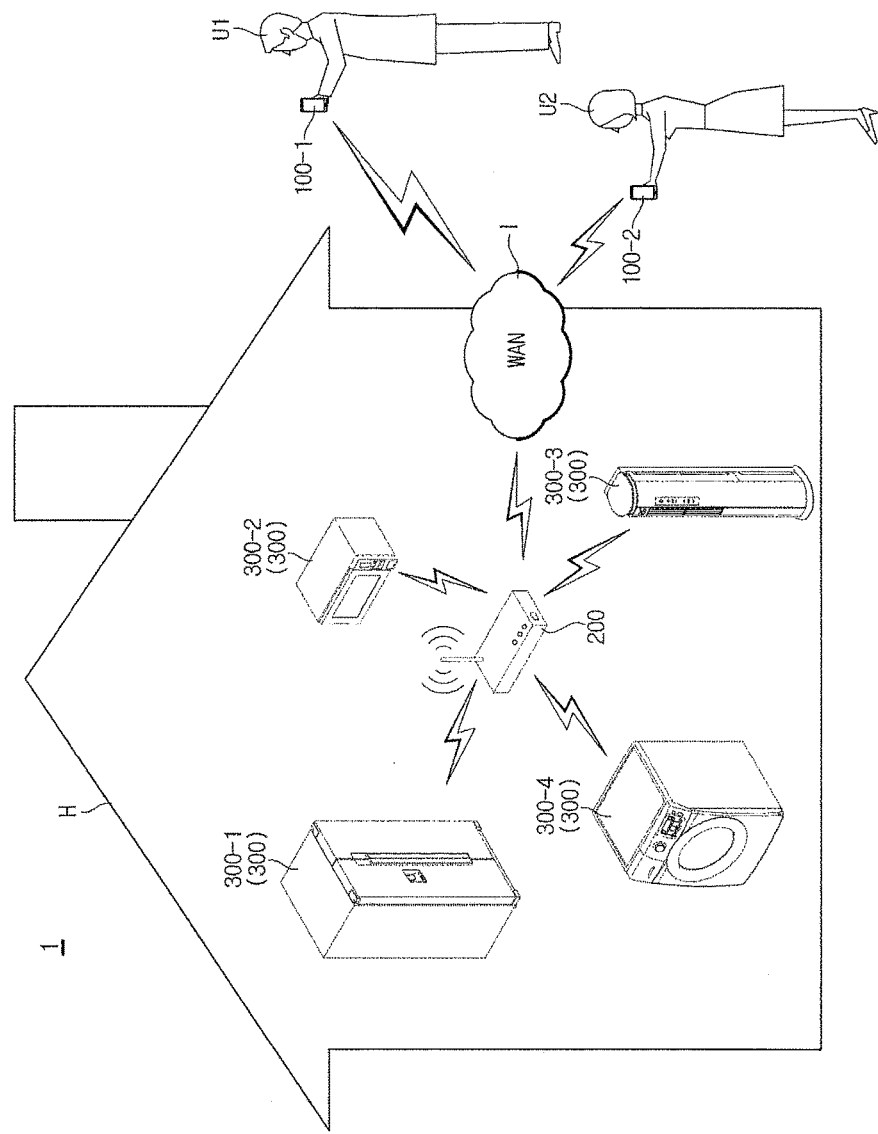
FIG. 2A is a drawing illustrating a case in which a portable terminal of a user U is not connected to an access point included in the home network system in accordance with an embodiment of the present disclosure.
Figure 2B:
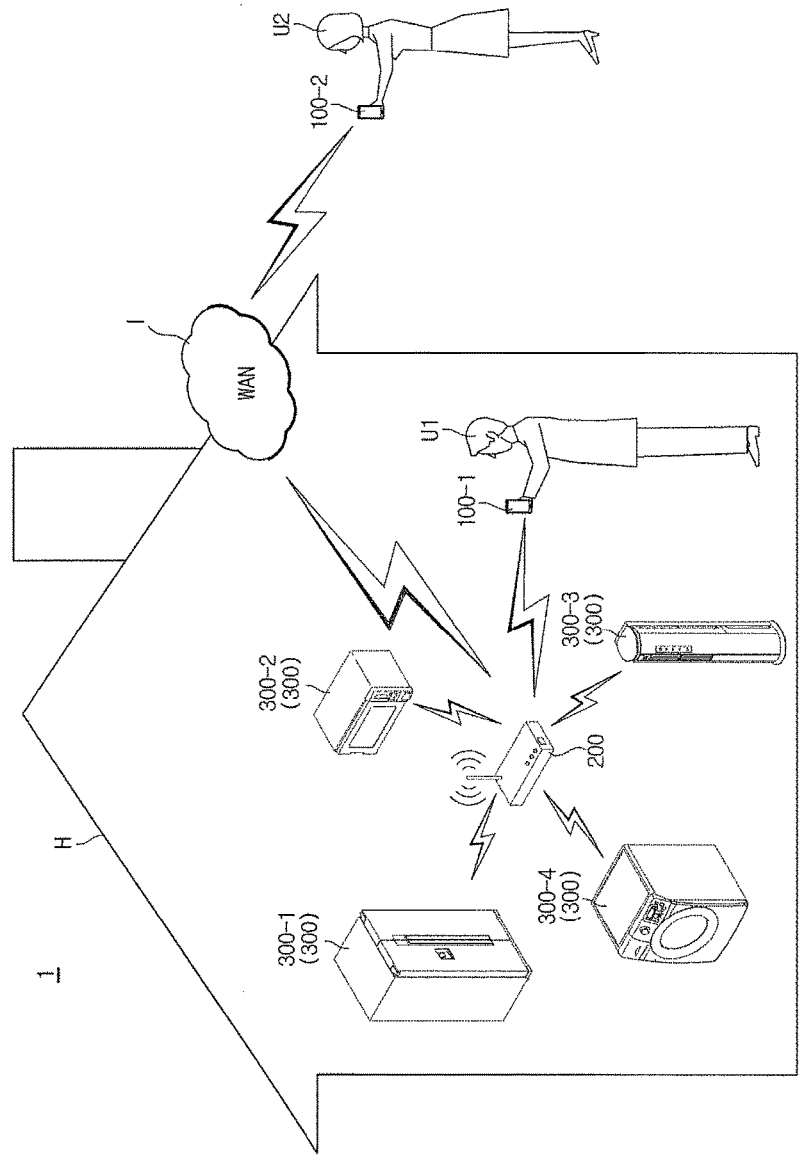
FIG. 2B is a drawing illustrating a case in which the portable terminal of the user U is connected to the access point included in the home network system in accordance with an embodiment of the present disclosure.

FIG. 1 is a drawing illustrating a home network system in accordance with an embodiment of the present disclosure, FIG. 2A is a drawing illustrating a case in which a portable terminal of a user U is not connected to an access point included in the home network system in accordance with an embodiment of the present disclosure, and FIG. 2B is a drawing illustrating a case in which the portable terminal of the user U is connected to the access point included in the home network system in accordance with an embodiment of the present disclosure.

Referring to FIGS. 1, 2A and 2B, a home network system 1 in accordance with an embodiment of the present disclosure includes a home appliance 300 to perform a predetermined function according to an operation command of a user U, a portable terminal 100 carried by the user U, and an access point (AP) 200 to allow the home appliance 300 and the portable terminal 100 to connect to a wide area network (WAN). As non-limiting examples, the home appliance 300 includes a refrigerator 300-1, a microwave oven 300-2, an air conditioner 300-3, and a washing machine 300-4. The portable terminal 100 includes a first portable terminal 100-1 carried by a first user U1 and a second portable terminal 100-2 carried by a second user U2. The number of the home appliance 300 and the portable terminal is not limited thereto, one or more home appliances and portable terminals may be used in the home network system. Here, the home appliance 300 and the AP 200 are located at a home H of the user U, while the portable terminal 100 is carried by the user U, and thus may be located on the home H of the user U as shown in FIG. 2B, or may be located at another place other than the home H of the user U. In addition, as the portable terminal 100 connects to the AP 200 that is located at the home H of the user U, the home appliance 300 determines that the user U enters or exists in the home H.

The portable terminal 100 may connect to the wide area network I. In a case in which the user U is outside the home H of the user U, the portable terminal 100 may connect to the wide area network I through an additional communication service as shown in FIG. 2A. In a case in which the user U is inside the home H of the user U, the portable terminal 100 may connect to the wide area network I through the AP 200. As the portable terminal 100 connects to the AP 200, unique identification information of the portable terminal 100 is provided to the AP 200, so that the AP 200 distinguishes the first portable terminal 100-1 from the second portable terminal 100-2. In addition, as the portable terminal 100 connects to the AP 200, the portable terminal 100 may display a message that is previously set by the user U.

In addition, the portable terminal 100 receives a control command for the home appliance 300 from the user U, and transmits the received control command to the home appliance 300. Such a control command includes a control command for the home appliance 300 to perform a certain operation when the portable terminal 100 connects to the AP 200. For example, a control command is input such that the refrigerator 300-1 displays a predetermined message when the first portable terminal 100-1 connects to the AP 200, and the microwave oven 300-2 cooks a substance and the air conditioner 300-3 operates when the second portable terminal 100-2 connects to the AP 200.

Referring to FIG. 2A, the AP 200 allows the portable terminal 100 or the home appliance 300 to connect to the wide area network I. In addition, as shown in FIG. 2B, if the connection of the portable terminal is achieved, the AP 200 identifies the connected portable terminal 100, and notifies the home appliance 300 that the connection of the identified portable terminal 100 is achieved.

The home appliance 300 performs its own unique operation. For example, the refrigerator 300-1 cools foods and stores the food in a cooled state, the microwave oven 300-2 cooks a substance of cooking by use of microwaves, the air conditioner 300-3 adjusts the temperature of the home H of the user U, and the washing machine 300-4 washes a substance of washing.

In addition, by detecting the fact that the portable terminal 100 is connected to the AP 200 as well as identification information of the portable terminal 100 connected to the AP 200, the home appliance 300 does not only detect that the user U enters or exists in the home H, but also detect which of the first user U1 and the second user U2 enters or exists in the home H. If determined that the user U enters or exists in the home H, the home appliance 300 performs a corresponding operation. For example, if the first portable terminal 100-1 connects to the AP 200, the refrigerator 300-1 displays a predetermined message, and if the second portable terminal 100-2 connects to the AP 200, the microwave oven 300-2 starts cooking and the air conditioner 300-3 adjusts the temperature of inside the home H.

That is, the home appliance 300 receives information regarding the entrance and exit of the user U from the AP 200, and performs a predetermined operation corresponding to the entrance and exit of the user U.

Hereinafter, each part of the home network system 1 will be described in detail.

Figure 3A:
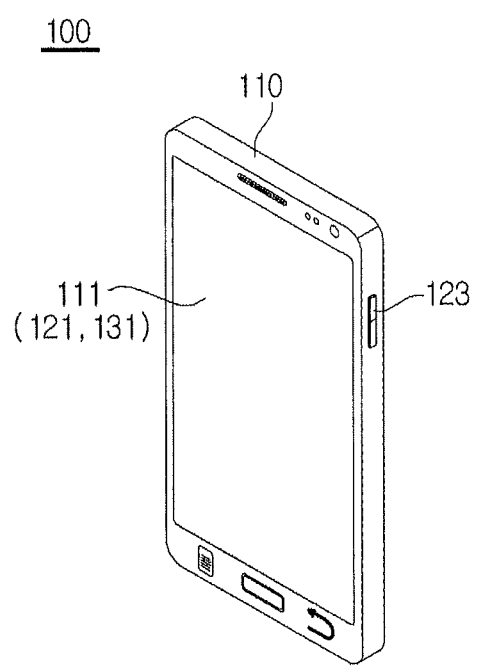
FIG. 3A is a drawing illustrating an external appearance of the portable terminal included in the home network system in accordance with an embodiment of the present disclosure.

FIG. 3A is a drawing illustrating an external appearance of the portable terminal included in the home network system in accordance with an embodiment of the present disclosure.

Referring to FIG. 3A, the portable terminal 100 includes a portable terminal body 110 forming the external appearance of the portable terminal 100, a portable terminal touch screen panel (TSP) 111 to receive an operation command from the user U and display operation information of the portable terminal 100 according to the operation command, and a portable terminal power button 123 to turn on or off the portable terminal 100.

The portable terminal TSP 111 includes a touch panel 121 to detect a position contacted by the user U thereof, and a display panel 131 to display information that changes according to an operation command corresponding to the contact position, the touch panel 121 integrally formed with the display panel 131. As the touch panel 121, for example, a capacitive touch panel or a resistive touch panel may be adopted, and as the display panel 131, for example, a liquid crystal display (LCD) panel, an organic light emitting diode (OLED) and a light emitting diode (LED) panel may be adopted.

Figure 3B:
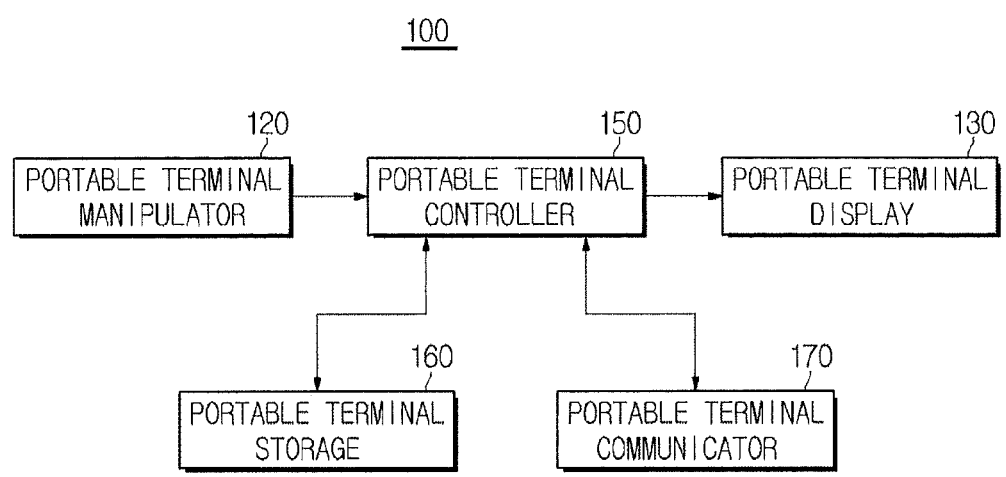
FIG. 3B is a drawing showing a control flow of the portable terminal included in the home network system in accordance with an embodiment of the present disclosure.

FIG. 3B is a drawing showing a control flow of the portable terminal included in the home network system in accordance with an embodiment of the present disclosure.

Referring to FIG. 3B, the portable terminal 100 includes a portable terminal manipulator 120 to receive a command from the user U, a portable terminal display 130 to display information that is commanded by the user to be displayed, a portable terminal storage 160 to store programs and data that are used to control the portable terminal 100, a portable terminal communicator 170 to communicate with an external communication device, and a portable terminal controller 150 to control an overall operation of the portable terminal 100.

The portable terminal manipulator 120 includes the portable terminal power button 123 and the touch panel 121 of the touch screen panel 121, which are described above, and receives an operation command of the user U and outputs a signal corresponding to the received operation command.

The portable terminal display 130 includes the display panel 131 of the touch screen panel 111 described above, and displays operation information of the portable terminal 100, information requested by a user or a message previously determined by a user according to a command input through the portable terminal manipulator 120.

The portable terminal storage 160 may include a non-volatile memory, such as a magnetic disk and a solid state disk, as well as a volatile memory, such as a D-RAM and S-RAM.

The portable terminal communicator 170 includes a wireless communication module, such as Wireless Fidelity (Wi-Fi), Bluetooth, Zigbee, near field communication (NFC), and wireless broadband internet (Wibro).

For example, the portable terminal communicator 170 may allow the portable terminal 100 to be connected to the wide area network I through the AP 200 by connecting the portable terminal 100 to the AP 200 by use of a Wi-Fi communication module. In addition, the portable terminal communicator 170 may allow the portable terminal 100 to be directly connected to the wide area network I, such as Internet, by use of a Wibro communication module. In detail, the portable terminal 100, after primarily connecting to the wide area network I through the Wibro communication module, scans for the AP 200, and connects to the AP 200 through a Wi-Fi module if the AP 200 is found, and then connects to the broad area network I via the AP 200. If the AP 200 is not found, the portable terminal 100 connects to the wide area network I by use of a Wibro communication module of the portable terminal communicator 170.

If the portable terminal 100 connects to the AP 200, the portable terminal communicator 170 transmits unique identification information of the portable terminal 100 to the AP 200. The identification information includes any one of a media access control address (MAC address), which is referred to as a unique identifier assigned to a network adaptor, a service set identifier (SSID) that exists on each packet header transmitted through a wireless-LAN, and a predetermined identifier (ID) that is previously determined by the user U. In this manner, the AP 200 identifies the portable terminal 100 connected to the AP 200, through the identification information that is transmitted by the portable terminal 100.

The portable terminal controller 150 controls an overall operation of the portable terminal 100. In detail, the portable terminal controller 150 achieves connection to the wide area network I by controlling the portable terminal communicator 170 according to an operation command of the user U input through the portable terminal manipulator 170, and allows information or a message that corresponds to the operation command of the user U by controlling the portable terminal display 130.

In addition, when the user inputs a remote control command for the home appliance 300 through the portable terminal manipulator 120, the portable terminal controller 150 may transmit the received remote control command to the home appliance 300 by controlling the portable terminal communicator 170.

Figure 4A:
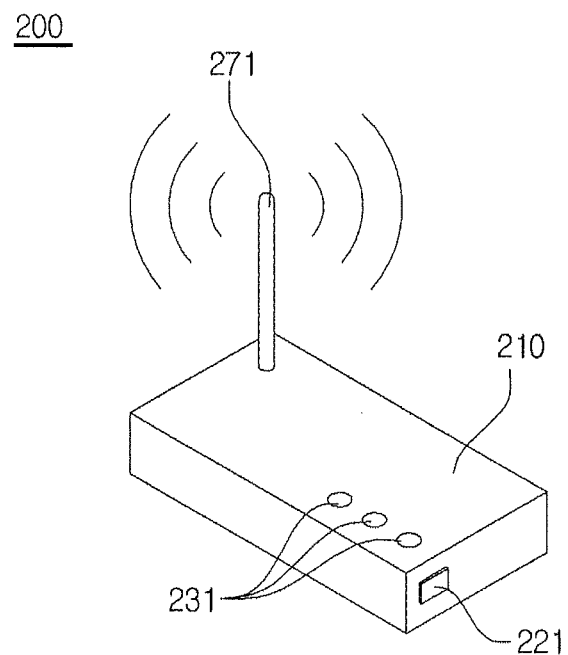
FIG. 4A is a drawing illustrating an external appearance of the access point included in the home network system in accordance with an embodiment of the present disclosure.

FIG. 4A is a drawing illustrating an external appearance of an access point included in the home network system in accordance with an embodiment of the present disclosure.

Referring to FIG. 4A, the AP 200 includes an AP body 210 forming the external appearance thereof, an AP power button 221 to turn on or off the AP 200, an AP light emitting diode (LED) 231 to display the operation information of the AP 200, and an AP antenna 271 to transmit and receive wireless signals.

Figure 4B:
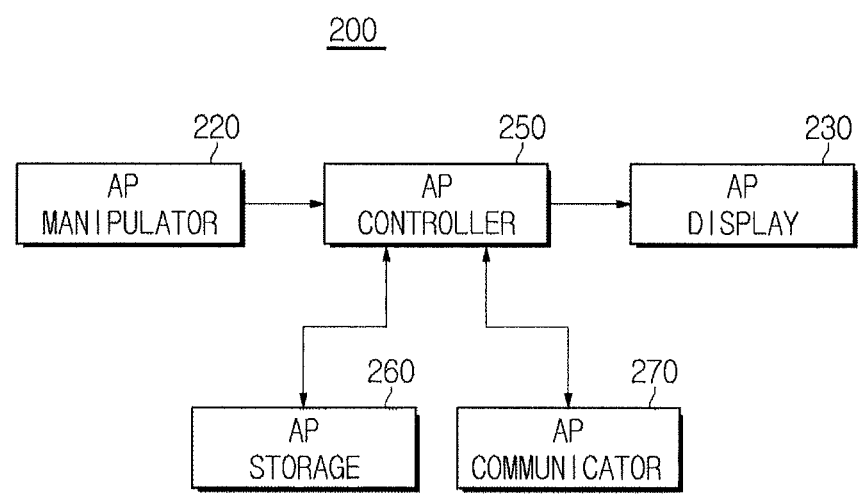
FIG. 4B is a drawing showing a control flow of the access point included in the home network system in accordance with an embodiment of the present disclosure.

FIG. 4B is a drawing showing a control flow of the access point included in the home network system in accordance with an embodiment of the present disclosure.

Referring to FIG. 4B, the AP 200 includes an AP manipulator 220 to receive an operation command from the user U, an AP display 230 to display operation information of the AP 200, an AP storage 260 to store programs and data that are used to control the AP 200, an AP communicator 170 to communicate with an external communicator device, and an AP controller 250 to control an overall operation of the AP 100.

The AP manipulator 220 includes the AP power button 221 that is described above, and receives an operation command of the user U to output a signal corresponding to the received operation command.

The AP display 230 includes the AP LED 231 that is described above, and displays operation information of the AP, regarding the supply of power and the normal operation of the AP 200.

The AP storage 260 may include a non-volatile memory, such as a magnetic disk and a solid state disk, as well as a volatile memory such as a D-RAM and S-RAM.

The AP communicator 270 may include a wireless communication module, such as Wireless Fidelity (Wi-Fi), Bluetooth, Zigbee, near field communication (NFC), and wireless broadband internet (Wibro), and a wired communication module, such as local area network (LAN) and wide area network (WAN). In detail, the AP communicator 270 communicates with the home appliance 300 through the wireless communication module, and communicates with external servers through the wired communication module.

The AP controller 250 controls the overall operation of the AP 200. In detail, the AP controller 250 communicates with the portable terminal 100 or the home appliance 300 by controlling the wireless communication module of the AP communicator 270, and communicates with the external servers on the wide area network I by controlling the wired communication module.

In addition, upon a request by the portable terminal 100 for communication, the AP controller 250 receives identification information of the portable terminal 100 from the portable terminal 100 by controlling the AP communicator 270, and identifies the connected portable terminal 100 based on the received identification information. Thereafter, the AP controller 250 notifies the home appliance 300 that the identified portable terminal 100 is connected.

Figure 5A:
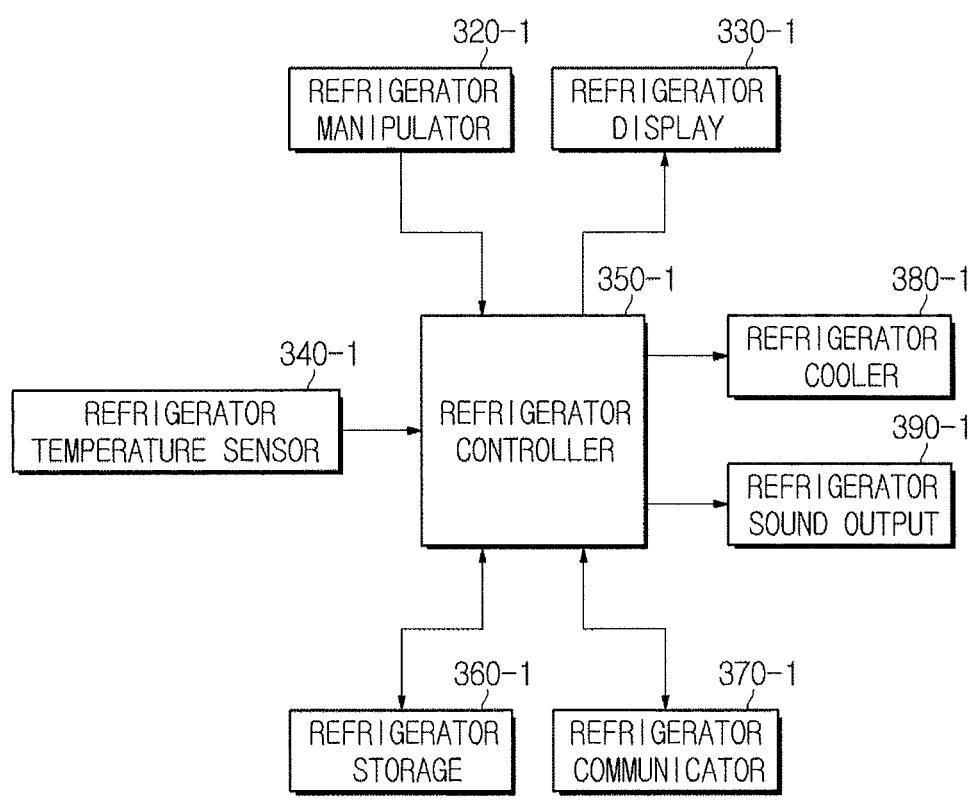
FIG. 5A is a drawing showing a control flow of a refrigerator included in the home network system in accordance with an embodiment of the present disclosure.

FIG. 5A is a drawing showing a control flow of the refrigerator included in the home network system in accordance with an embodiment of the present disclosure.

Referring FIG. 5A, the refrigerator 300-1 includes a refrigerator manipulator 320-1 to receive an operation command for the refrigerator 300-1, a refrigerator display 330-1 to display operation information of the refrigerator 300-1, a refrigerator temperature sensor 340-1 to detect the temperature of a storage compartment (not shown) that stores food, a refrigerator cooler 380-1 to cool the storage compartment (not shown) that stores food, and a refrigerator sound output 390-1 to output sound associated with the operation of the refrigerator 300-1. In addition, the refrigerator 300-1 includes a refrigerator storage 360-1 to store programs and data associated with the operation of the refrigerator 300-1, a refrigerator communicator 370-1 to communicate with the AP 200 so as to connect to the wide area network I, and a refrigerator controller 350-1 to control the overall operation of the refrigerator 300-1.

The refrigerator cooler 380-1 includes a flow passage (not shown) in which refrigerant circulates, a compressor (not shown) to compress refrigerant, a condenser (not shown) to condense refrigerant, an expander (not shown) to decompress the condensed refrigerant, and an evaporator (not shown) to evaporate the decompressed refrigerant, and cools the storage compartment (not shown) by absorbing surrounding heat when refrigerant is evaporated by the evaporator (not shown).

In this case, the user U may input a control command for the refrigerator 300-1 through the refrigerator manipulator 320-1 and the portable terminal 100. The control command includes a control command to directly control the operation of the refrigerator 300-1, for example, a control command to set the temperature of the storage compartment (not shown) provided in the refrigerator 300-1, and a scheduled control command to schedule an operation of the refrigerator 300-1 depending on the entrance and exit of the user, for example, a command to display a certain message on the refrigerator display 330-1 when a certain user enters the home H.

For example, in a case when the second user U2 puts some fruit in the refrigerator 300-1, and desires to allow the refrigerator 300-1 and the first portable terminal 100-1 of the first user U1 to display a message instructing to take in the fruit stored in the refrigerator 300-1 when the first user U1 enters the home H, the second user U2 may input a control command indicating the above contents into the refrigerator 300-1 through the refrigerator manipulator 320-1 or the second portable terminal 100-2 possessed by the second user U2. The first user U1 enters the home H, and as the first portable terminal 100-1 connects to the AP 200, the AP 200 receives identification information of the portable terminal 100 to identify the first portable terminal 100-1, and notifies the home appliance 300, such as the refrigerator 300-1, of the connection of the first portable terminal 100-1.

Thereafter, the refrigerator 300-1 outputs an alarming sound through the refrigerator sound output 390-1, displays a message of the second user U2 about taking in the fruits stored in the refrigerator 300-1 through the refrigerator display 330-1, and sends the first portable terminal 100-1 the message of the second user U2 about taking in the fruits stored in the refrigerator 300-1 through the AP 200.

Accordingly, the first portable terminal 100-1 displays the message of the second user U2 to take in the fruits stored in the refrigerator 300-1.

Figure 5B:
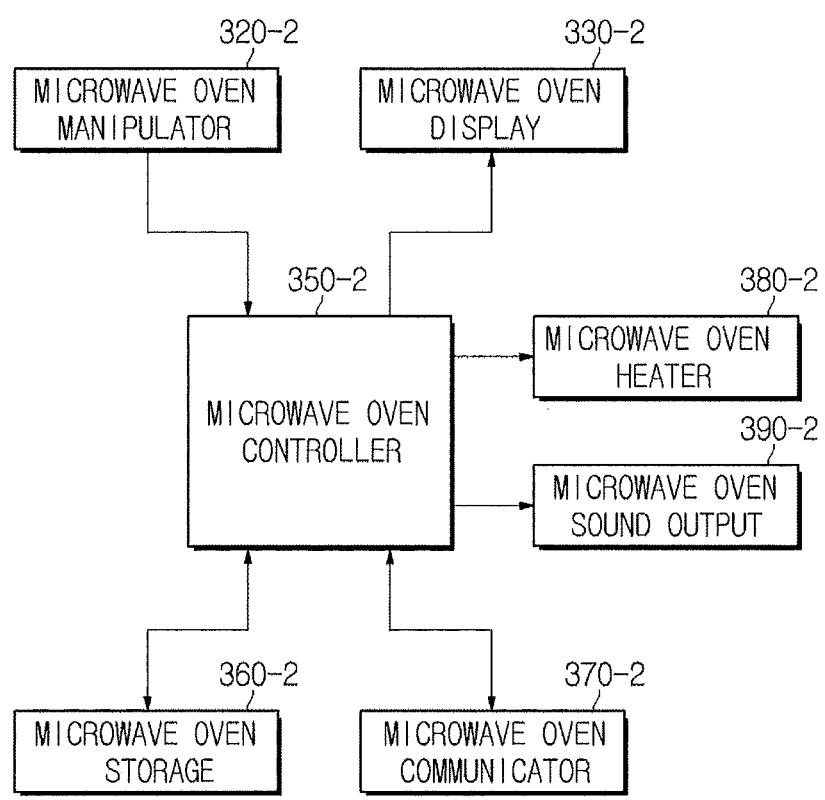
FIG. 5B is a drawing showing a control flow of a microwave oven included in the home network system in accordance with an embodiment of the present disclosure.

FIG. 5B is a drawing showing a control flow of the microwave oven included in the home network system in accordance with an embodiment of the present disclosure.

Referring FIG. 5B, the microwave oven 300-2 includes a microwave manipulator 320-2 to receive an operation command for the microwave oven 300-2, a microwave oven display 330-2 to display operation information of the microwave oven 300-2, a microwave oven heater 380-2 to heat the subject of cooking that is located in a cooking chamber (not shown), and a microwave oven sound output 390-2 to output sound associated with the operation of the microwave oven 300-2. In addition, the microwave oven 300-2 includes a microwave oven storage 360-2 to store programs and data associated with the operation of the microwave oven 300-2, a microwave oven communicator 370-2 to communicate with the AP 200 so as to connect to the wide area network I, and a microwave oven controller 350-2 to control the overall operation of the microwave oven 300-2.

The microwave oven heater 380-2 includes a radio frequency heater (not shown) to emit radiofrequency waves to the cooking chamber (not shown), a convection heater (not shown) to supply heated air to the cooking chamber (not shown), and a grill heater (not shown) to supply the cooking chamber (not shown) with radiant heat.

In this case, the user may input a control command for the microwave oven 300-2 through the microwave oven manipulator 320-2 and the portable terminal 100. The control command includes a control command to directly control the operation of the microwave oven 300-2, for example, a control command to operate the microwave oven heater 380-2, and a scheduled control command to schedule an operation of the microwave oven heater 380-2 depending on the entrance and exit of a certain user.

For example, if the second user U2 puts food inside the microwave oven 300-2 while going out, and desires to allow the microwave oven 300-2 to warm the food and allowing the first portable terminal 100-1 to display a message instructing the first user U1 to take in the warmed food when the first user U1 enters the home H, the second user U2 may input a control command indicating the above contents into the microwave oven 300-2 through the microwave oven manipulator 320-2 or the portable terminal 100. The first user U1 enters the home H, and as the first portable terminal 100-1 connects to the AP 200, the AP 200 receives identification information of the portable terminal 100 to identify the first portable terminal 100-1, and notifies the home appliance 300, such as the microwave oven 300-2, of the connection of the first portable terminal 100-1.

Upon notified that the first portable terminal 100-1 is connected to the AP 200, the microwave oven 300-2 operates the microwave oven heater 380-2 to warm the food in the cooking chamber (not shown), and sends the first portable terminal 100-1 a message of the second user U2 take out the food placed in the microwave oven 300-2 through the AP 200.

Accordingly, the first portable terminal 100-1 displays the message of the second user U2 instructing to take in the food heated by the microwave oven 300-2.

Figure 5C:
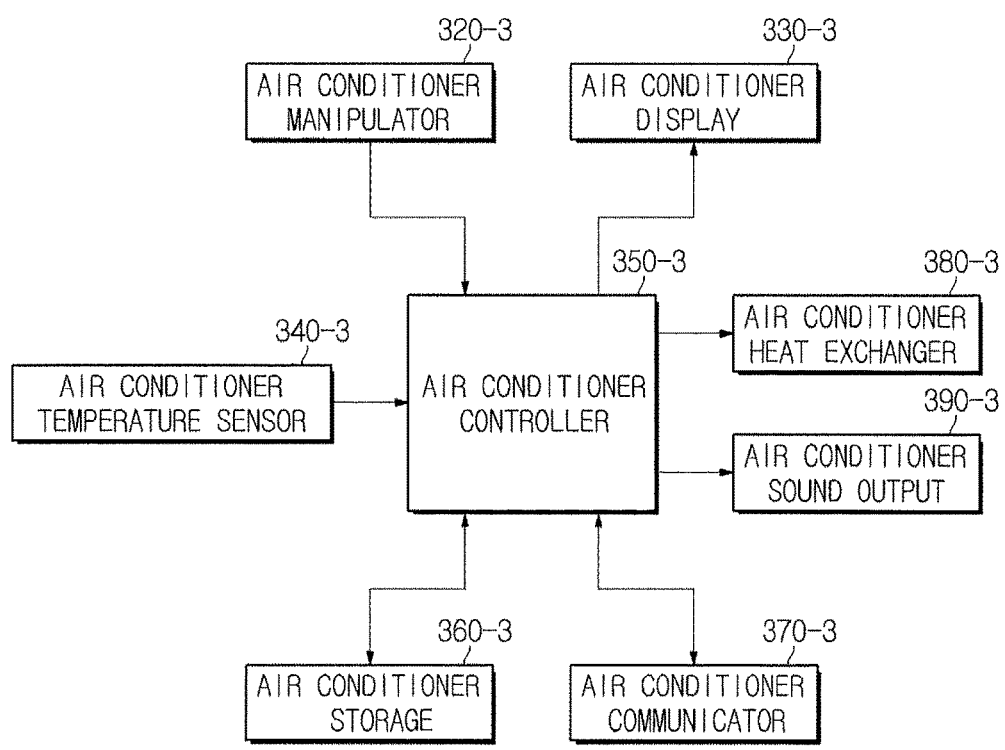
FIG. 5C is a drawing showing a control flow of an air conditioner included in the home network system in accordance with an embodiment of the present disclosure.

FIG. 5C is a drawing showing a control flow of the air conditioner in accordance with an embodiment of the present disclosure.

Referring FIG. 5C, the air conditioner 300-3 includes an air conditioner manipulator 320-3 to receive an operation command for the air conditioner 300-3, an air conditioner display 330-3 to display operation information of the air conditioner 300-3, an air conditioner temperature sensor 340-3 to detect the indoor temperature, an air conditioner heat exchanger 380-3 to adjust the indoor temperature, and an air conditioner sound output 390-3 to output sound associated with the operation of the air conditioner 300-3. In addition, the air conditioner 300-3 includes an air conditioner storage 360-3 to store programs and data associated with the operation of the air conditioner 300-3, an air conditioner communicator 370-3 to communicate with the AP 200 so as to connect to the wide area network I, and an air conditioner controller 350-3 to control the overall operation of the air conditioner 300-3.

The air conditioner heat exchanger 380-3 includes a flow passage (not shown) in which refrigerant circulates, a compressor (not shown) to compress refrigerant, an outdoor heat exchanger (not shown) to perform heat exchange between refrigerant and outdoor air, an expander (not shown) to decompress refrigerant, and an indoor heat exchanger (not shown) to perform heat exchange between refrigerant and indoor air. The air conditioner heat exchanger 380-3 adjusts the indoor temperature by absorbing surrounding heat when the refrigerant is evaporated, and emitting heat to the surrounding when the refrigerant is condensed.

A user may input a control command for the air conditioner 300-3 through the air conditioner manipulator 320-3 and the portable terminal 100. The control command includes a control command to directly control the operation of the air conditioner 300-3, for example, a control command to select an operation mode of the air conditioner 300-3 and operate the air conditioner 300-3, and a scheduled control command to schedule an operation of the air conditioner 300-3 depending on the entrance and exit of a certain user.

For example, if the first user U1 desires to allow the air conditioner 300-3 to operate upon return home from an outing, the first user U1 may input a control command indicating the above contents into the air conditioner 300-3 through the first portable terminal 100-1 possessed by the first user U1. The first user U1 enters the home H, and as the first portable terminal 100-1 connects to the AP 200, the AP 200 receives identification information of the first portable terminal 100-1 to identify the first portable terminal 100-1, and notifies the home appliance 300, such as the air conditioner 300-3, of the connection of the first portable terminal 100-1.

Upon notified that the first portable terminal 100-1 is connected to the AP 200, the air conditioner 300-3 operates the air conditioner heat exchanger 380-3.

Figure 5D:
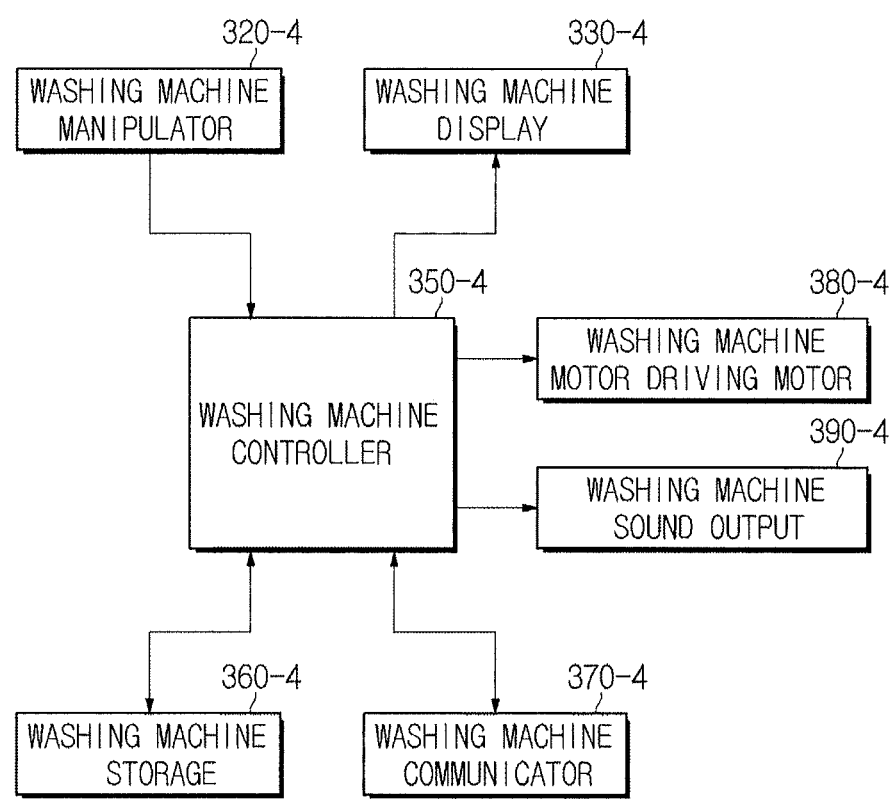
FIG. 5D is a drawing showing a control flow of a washing machine included in the home network system in accordance with an embodiment of the present disclosure.

FIG. 5D is a drawing showing a control flow of the washing machine in accordance with an embodiment of the present disclosure.

Referring FIG. 5D, the washing machine 300-4 includes a washing machine manipulator 320-4 to receive an operation command for the washing machine 300-4, a washing machine display 330-4 to display operation information of the washing machine 300-4, a washing machine driving motor 380-4 to rotate a drum (not shown), and a washing machine sound output 390-4 to output sound associated with the operation of the washing machine 300-4. In addition, the washing machine 300-4 includes a washing machine storage 360-4 to store programs and data associated with the operation of the washing machine 300-4, a washing machine communicator 370-4 to communicate with the AP 200 so as to connect to the wide area network I, and a washing machine controller 350-4 to control the overall operation of the washing machine 300-4.

The washing machine 300-4 accommodates laundry to be washed in the drum (not shown), and washes the laundry by rotating the drum (not shown) by use of the washing machine driving motor 380-4.

In this case, a user may input a control command for the washing machine 300-4 through the washing machine manipulator 320-4 and the portable terminal 100.

For example, if the first user U1, who operates the washing machine 300-4 while going out, desires to allow the washing machine 300-4 and the first portable terminal 100-1 possessed by the first user U1 to display a message indicating that the washing of laundry is finished when the first user U1 returns home, the first user U1 may input a control command indicating the above contents into the washing machine 300-4 through the washing machine manipulator 320-4 and the first portable terminal 100-1. Accordingly, the washing machine 300-4 performs a washing operation on the laundry to be washed. Thereafter, the first user U1 enters the home H, and as the first portable terminal 100-1 connects to the AP 200, the AP 200 receives identification information of the first portable terminal 100-1 to identify the first portable terminal 100-1, and notifies the home appliance 300, such as the washing machine 300-4, of the connection of the first portable terminal 100-1.

Upon notified that the first portable terminal 100-1 is connected to the AP 200, the washing machine 300-4 outputs alarming sound through the washing machine sound output 390-4, indicates through the washing machine display 330-4 that the washing is finished, and sends through the AP 200 the first portable terminal 100-1 a message stating that the washing operation is finished.

Accordingly, the first portable terminal 100-1 indicates that the washing operation is finished.

The above description has been made in relation to each component of the home network system 1. Hereinafter, the operation of the home network system 1 will be described.

Figure 6:
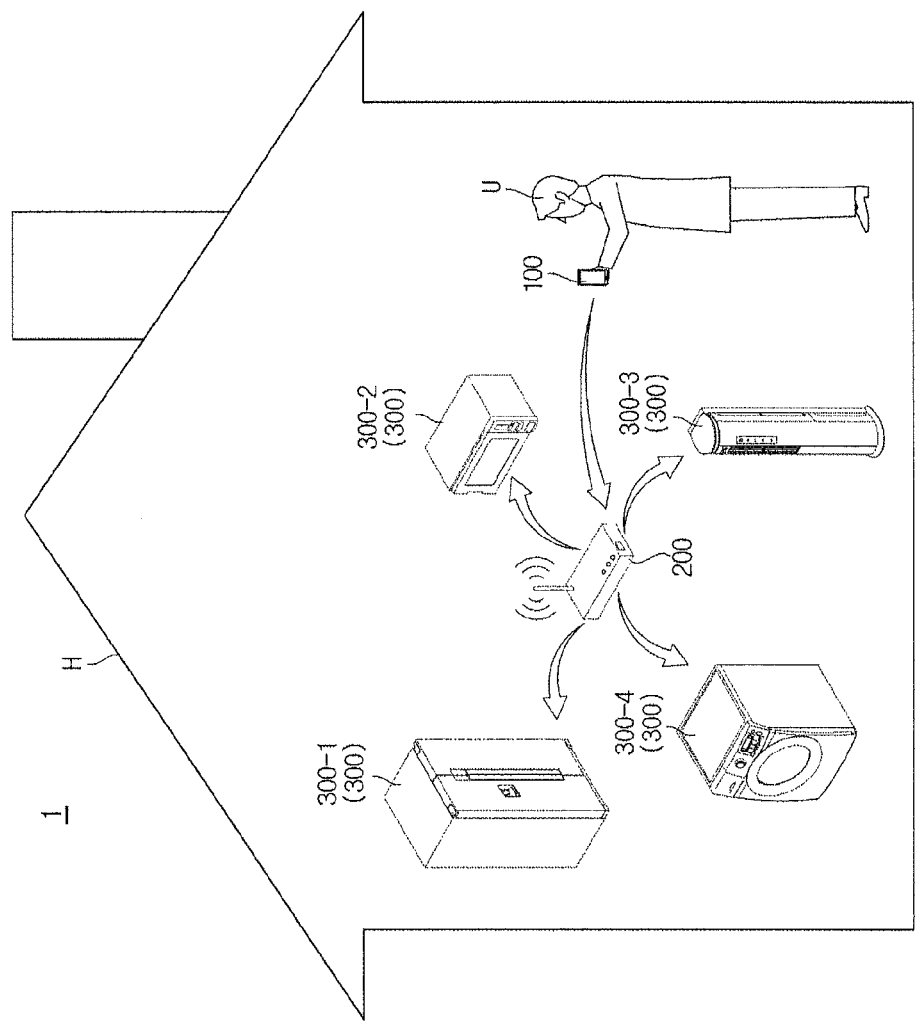
FIG. 6 is a drawing illustrating an operation of the home network system in accordance with an embodiment of the present disclosure.

FIG. 6 is a drawing illustrating an operation of the home network system in accordance with an embodiment of the present disclosure.

Referring to FIG. 6, a user U, through the portable terminal 100 or the home appliance 300, inputs a control command instructing the home appliance 300 to perform a certain operation when the user U enters the home H, that is, when a connection to the AP 200 is achieved.

As the user U returns the home H, the portable terminal 100 requests a connection to the AP 200 while sending the AP 200 identification information of the portable terminal 100.

As the portable terminal 100 is connected to the AP 200, the AP 200 identifies the connected portable terminal 100 based on the identification information.

Thereafter, the AP 200 notifies the home appliance 300, such as the refrigerator 300-1, the microwave oven 300-2, the air conditioner 300-3 and the washing machine 300-4, that the portable terminal 100 is connected to the AP 200.

The home appliance 300 notified of the connection of the portable terminal 100 identifies the user U who possesses the connected portable terminal 100, and performs a certain operation that is previously determined.

Figure 7:
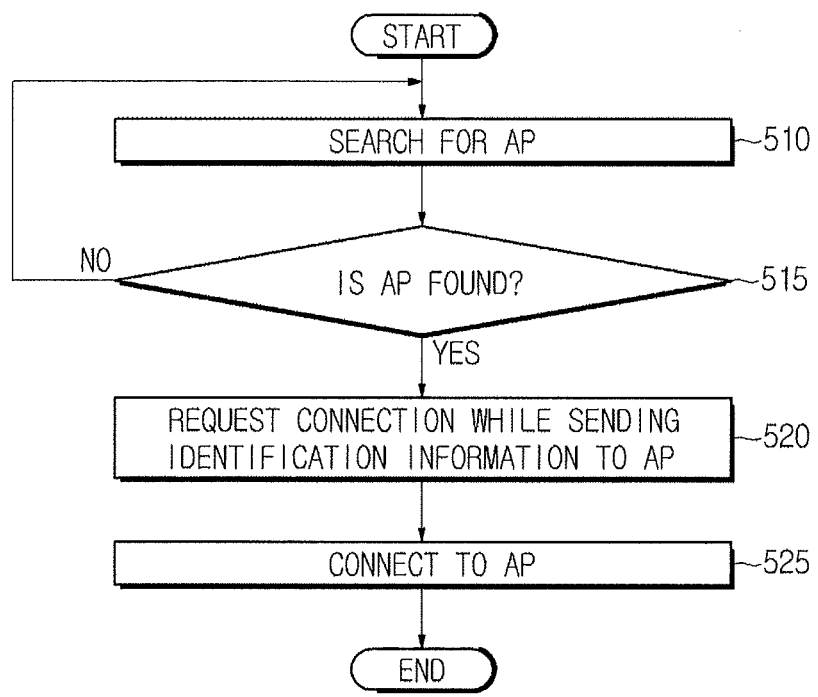
FIG. 7 is a flow chart showing an operation of the portable terminal included in the home network system in accordance with an embodiment of the present disclosure.

FIG. 7 is a flow chart showing an operation of the portable terminal included in the home network system in accordance with an embodiment of the present disclosure.

Referring to FIG. 7, the portable terminal 100 scans the AP 510 in a surrounding area (510), and determines whether or not the AP 510 is found in the surrounding area (515).

If determined that the AP 200 is not found in the surrounding area (NO from operation 515), the scanning of the AP 510 is repeated.

If determined that the AP 200 is found in the surrounding area (YES from operation 515), the portable terminal 100 transmits a request to the AP for connection to the AP 200 while transmitting identification of the portable terminal 100 to the AP 200 (520).

Thereafter, the portable terminal 100 connects to the AP 200 (525).

Figure 8:
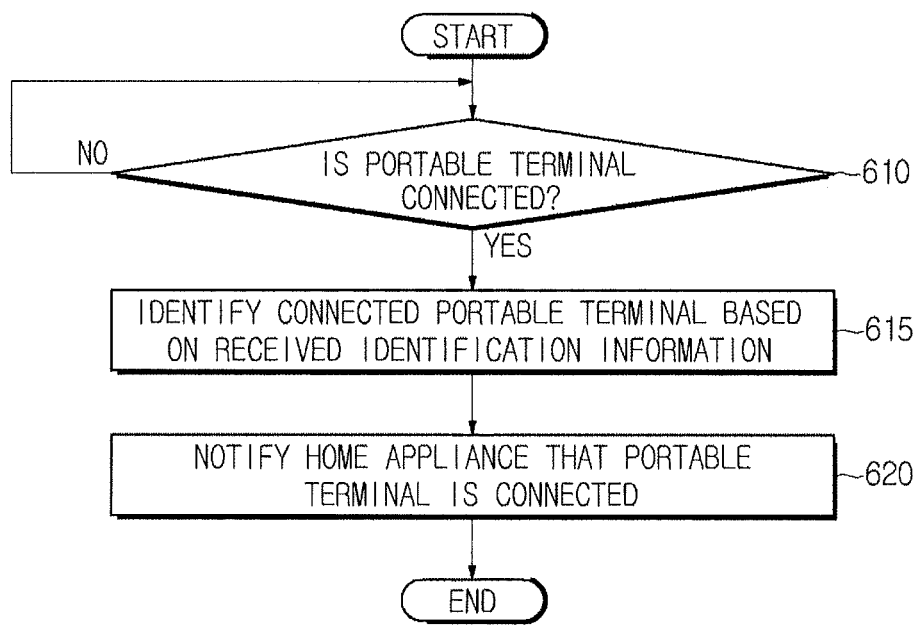
FIG. 8 is a flow chart showing an operation of the access point included in the home network system in accordance with an embodiment of the present disclosure.

FIG. 8 is a flow chart showing an operation of the access point included in the home network system in accordance with an embodiment of the present disclosure.

Referring to FIG. 8, first, the AP 200 determines whether or not the portable terminal 100 is connected to the AP 200 (610).

If determined that the portable terminal 100 is connected to the AP 200 (YES from operation 610), the AP 200 identifies the connected portable terminal 100 based on the received identification information (615).

Thereafter, the AP 200 sends the home appliance 300 a notification that the portable terminal 100 is connected to the AP 200 (620).

Figure 9:
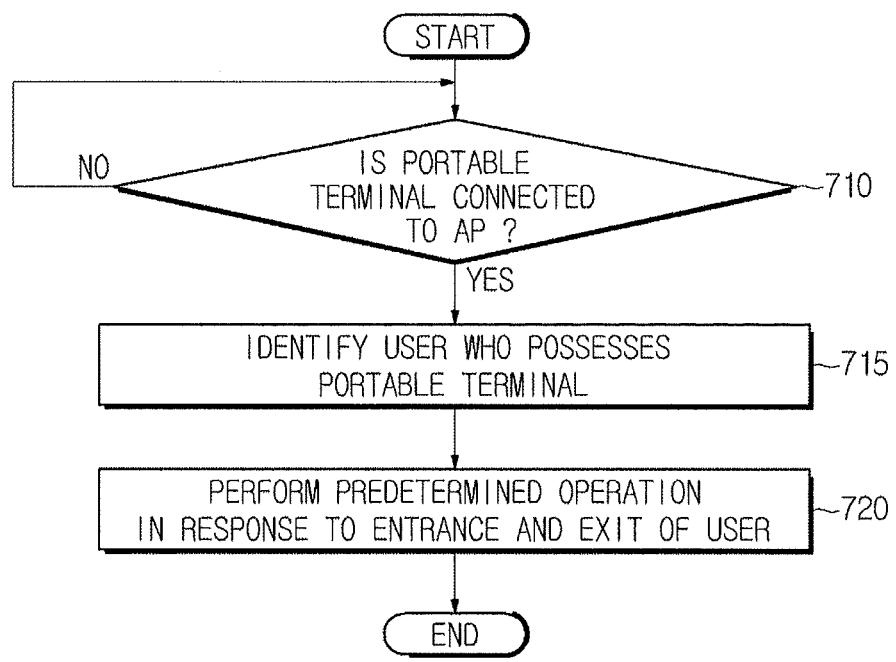
FIG. 9 is an operation of the home appliance included in the home network system in accordance with an embodiment of the present disclosure.

FIG. 9 is an operation of the home appliance included in the home network system in accordance with an embodiment of the present disclosure.

Referring to FIG. 9, the home appliance 300 determines whether or not the portable terminal 100 is connected to the AP 200 (710).

If determined that the portable terminal 100 is connected to the AP 200 (YES from operation 710), the home appliance 300 identifies the user who possesses the portable terminal 100 (715).

The home appliance 300 performs a predetermined operation in response to the entrance and exit of the user (720). For example, in a case of the refrigerator 300-1 as the home appliance 300, the refrigerator 300-1 may display a message that is previously set by the user U, when the user U enters the home H. In a case of the microwave oven 300-2 as the home appliance 300, the microwave oven 300-2 may heat the substance of cooking when the user U enters the home H. In addition, in a case of the air conditioner 300-3 as the home appliance 300, the air conditioner 300-3 may adjust the temperature of the home H when the user enters the home H. In a case of the washing machine 300-4 as the home appliance 300, the washing machine 300-4 may indicate that the washing operation is finished when the user U enters the home H.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method of controlling a single access point connectable to a plurality of home appliances, a first portable terminal used by a first user, and a second portable terminal used by a second user, the method comprising:
   connecting the single access point to at least one of the first portable terminal used by the first user and the second portable terminal used by the second user;
   identifying each of the users connected to the single access point;
   determining a relative location between the single access point, at least one of the plurality of the home appliances, and the identified users;

transmitting a first notification to the at least one of the plurality of the home appliances to perform a first operation upon a user of the first portable terminal being identified as the first user and determined as at a pre-determined location relative to the single access point and the at least one of the plurality of the home appliances, where the at least one of the plurality of the home appliances performs the first operation in response to receiving the first notification, and a first message transmitted indicating the performing of the first operation to the first portable terminal used by the first user;

receiving from the first user identification of a second operation to be performed by the at least one of the plurality of the home appliances based on the determined relative location of the second user to the single access point and the at least one of the plurality of the home appliances;

transmitting a second notification to the at least one of the plurality of the home appliances to perform the second operation identified by the first user upon a user of the second portable terminal being identified as the second user and determined as at a pre-determined location relative to the single access point and the at least one of the plurality of the home appliances, which performs the second operation identified by the first user in response to receiving the second notification regarding the second user; and transmitting a second message indicating the performing of the second operation to the second portable terminal used by the second user.

2. The method of claim 1, wherein the connecting of the at least one of the first portable terminal and the second portable terminal comprises:

receiving a request from the at least one of the first portable terminal and the second portable terminal for connection, and receiving identification information of the at least one of the first portable terminal and the second portable terminal.

3. The method of claim 2, wherein the identification information of the at least one of the first portable terminal and the second portable terminal includes at least one of a media access control address (MAC address), a service set identifier (SSID), and a predetermined identifier (ID).

4. The method of claim 2, wherein the transmitting of the notification comprises:

identifying the at least one of the first portable terminal and the second portable terminal based on the identification information, and transmitting the identification information and the notification to the home appliance.

5. A method of controlling a home appliance connectable to a single access point that is connectable to a first portable terminal and a second portable terminal, the method comprising:

receiving at least one of a first notification from the single access point indicating that the single access point is connected to the first portable terminal used by a user identified as a first user and determined as at a pre-determined location relative to the access point and the home appliance, and a second notification from the single access point indicating that the single access point is connected to the second portable terminal by a user identified as a second user and determined as at a pre-determined location relative to the access point and the home appliance; and performing a first operation by the home appliance upon receiving the first notification and transmitting a first message indicating the performing of the first operation by the home appliance to the first portable terminal used by the first user;

receiving from the first user identification of a second operation to be performed by the home appliance based on the determined location of the second user relative to the access point and the home appliance;

performing the second operation by the home appliance upon receiving the second notification; and transmitting a second message indicating the performing of the second operation to the second portable terminal used by the second user.

6. The method of claim 5, wherein the receiving of the notification comprises receiving identification information at least one of the first portable terminal and the second portable terminal.

7. The method of claim 6, further comprising:

identifying the at least one of the first portable terminal and the second portable terminal based on the identification information.

8. An access point comprising:

a communicator including a receiver and a transmitter configured to communicate with a plurality of portable terminals including at least one of a first portable terminal used by a first user and a second portable terminal used by a second user, and with a plurality of home appliances; and a controller including at least one memory storing instructions and at least one processor that executes the instructions stored in the at least one memory and configured to cause the following to be performed:

identifying each of the plurality of users connected to the access point;

determining a relative location between the access point, at least one of the plurality of home appliances, and the identified plurality of users;

controlling the transmitter of the communicator to transmit a first notification to the at least one of the plurality of the home appliances to perform a first operation upon a user of the first portable terminal being identified as the first user and determined as at a pre-determined location relative to the single access point and the at least one of the plurality of the home appliances, where the at least one of the plurality of the home appliances performs the first operation in response to receiving the first notification, and transmits a first message indicating the performing of the first operation to the first portable terminal used by the first user, receiving from the first user identification of a second operation to be performed by the at least one of the plurality of the home appliances based on the determined relative location of the second user to the single access point and the at least one of the plurality of the home appliances; and controlling the transmitter of the communicator to transmit a second notification to the at least one of the plurality of the home appliances to perform the second operation upon a user of the second portable terminal being identified as the second user and determined as at a pre-determined location relative to the single access point and the at least one of the plurality of the home appliances and to transmit a second message indicating the performing of the second operation to the second portable terminal, where the at least one of the plurality of the home appliances performs the second operation in response to receiving the second notification.

9. The access point of claim 8, wherein the receiver of the communicator receives a request from for connection to the at least one of the first portable terminal and the second portable terminal and identification information of the at least one of the first portable terminal and the second portable terminal.

10. The access point of claim 9, wherein the identification information of the at least one of the first portable terminal and the second portable terminal includes at least one of a media access control address (MAC address), a service set identifier (SSID), and a predetermined identifier (ID).

11. The access point of claim 9, wherein the controller controls the transmitter of the communicator to transmit the identification information of the at least one of the first portable terminal and the second portable terminal to the home appliance.

12. The access point of claim 11, wherein at least one of the first operation and the second operation includes an operation that the home appliance displays a previously stored message.

13. The access point of claim 11, wherein at least one of the first operation and the second operation includes an operation that the home appliance transmits the previously stored message to the portable terminal.

14. A home appliance comprising:
a user interface including at least one of a button and a touch panel operable to receive a command input by a user of the home appliance;
a display configured to display operation information of the home appliance;
a communicator including a receiver and a transmitter configured to receive a first notification from a single access point indicating that the single access point is connected to a first portable terminal used by a first user, identification of a second operation by the first user to be performed by the home appliance based on a pre-determined relative location of a second user to the single access point and the home appliance, and a second notification from the single access point indicating that the single access point is connected to a second portable terminal by second user; and
a controller including at least one memory storing instructions and at least one processor that executes the instructions stored in the at least one memory and configured to control at least one of the display and the communicator to cause the following to be performed:
performing a first operation upon receiving the first notification from the single access point indicating the first portable terminal is being used by the first user and located at a pre-determined location relative to the single access point and the home appliance and transmitting a first message indicating the performing of the first operation to the first portable terminal used by the first user; and
performing the second operation identified by the first user upon receiving the second notification from the single access point indicating the second portable terminal is being used by the second user and located at the pre-determined location relative to the single access point and the home appliance and transmitting a second message indicating the performing of the second operation to the second portable terminal used by the second user.

15. The home appliance of claim 14, wherein if at least one of the first portable terminal and the second portable terminal connects to the single access point, a predetermined message is displayed on the display.

16. The home appliance of claim 14, wherein if the at least one of the first portable terminal and the second portable terminal connects to the single access point, a predetermined message is transmitted to the portable terminal through the transmitter of the communicator.

17. The home appliance of claim 14, wherein a cooking space is provided thereof to accommodate a substance and a heater to heat the substance to be cooked,
wherein the controller controls the heater to heat the substance upon receiving the notification.

18. The home appliance of claim 14, further comprising a heat exchanger to adjust temperature of an air-conditioning space,
wherein the controller controls the heat exchanger to adjust the temperature of the air-conditioning space upon receiving the notification.

19. The home appliance of claim 14, further comprising a drum to accommodate a substance and a driving motor to rotate the drum such that the substance is washed,
wherein the controller controls the display to indicate that the substance to be washed is completed with washing upon receiving the notification.

20. The home appliance of claim 14, further comprising:
a sound output to output sound corresponding to operation information of the home appliance,
wherein the controller controls the sound output to output a predetermined sound upon receiving the notification.

21. A method of controlling a home network system including a home appliance, a first portable terminal, a second portable terminal, and a single access point to allow the home appliance and at least one of the first portable terminal and the second portable terminal to be connected to a wide area network (WAN), the method comprising:
inputting a first operation for the home appliance to perform;
connecting the first portable terminal used by a first user and the second portable terminal used by a second user to the single access point;
identifying each of the plurality of users connected to the single access point;
determining a relative location between the single access point and the identified plurality of users;
receiving from the first user identification of a second operation to be performed by the home appliance based on the determined relative location of the second user to the single access point and the home appliance;
transmitting a first notification to the home appliance by the single access point upon a user of the first portable terminal being identified as the first user and determined as at a pre-determined location relative to the single access point, and transmitting a second notification to the home appliance by the single access point upon a user of the second portable terminal being identified as the second user and determined as at the pre-determined location relative to the single access point; and
performing the first operation by the home appliance, upon receiving the first notification and transmitting a first message indicating the performing of the first operation to the first portable terminal used by the first user; and
performing the second operation identified by the first user by the home appliance upon receiving the second notification regarding the second user and transmitting a second message indicating the performing of the second operation to the second portable terminal used by the second user.

22. A home network system comprising:
a home appliance;
a first portable terminal used by a first user and a second portable terminal used by a second user, the first portable terminal and the second portable terminal respectively configured to receive a control command to perform a first operation and a second operation, which is identified by the first user, of the home appliance; and
a single access point configured to allow at least one of the home appliance and at least one of the first portable terminal and the second portable terminal to be connected to a wide area network (WAN),
wherein upon a user of the first portable terminal used being identified as the first user and a location of the first portable terming being at a pre-determined location relative to the single access point, the single access point transmits a first notification to the home appliance to perform the first operation and receives from the first user identification of a second operation to be performed by the home appliance based on the pre-determined relative location of the second user to the single access point and the home appliances, and the home appliance performs the first operation and in response to receiving the first notification and transmits a first message indicating the performing of the first operation to the first portable terminal used by the first user, and
upon a user of the second portable terminal used being identified as the second user and a location of the first portable terming being at a pre-determined location relative to the single access point, the single access point transmits a second notification to the home appliance to perform the second operation identified by the first user and the home appliance performs the second notification regarding the second user and transmits a second message indicating the performing of the second operation to the second portable terminal used by the second user.

* * * * *